Aug. 27, 1957  J. H. PRATER  2,804,317
SAFETY CUT-OFF VALVE
Filed Jan. 25, 1957
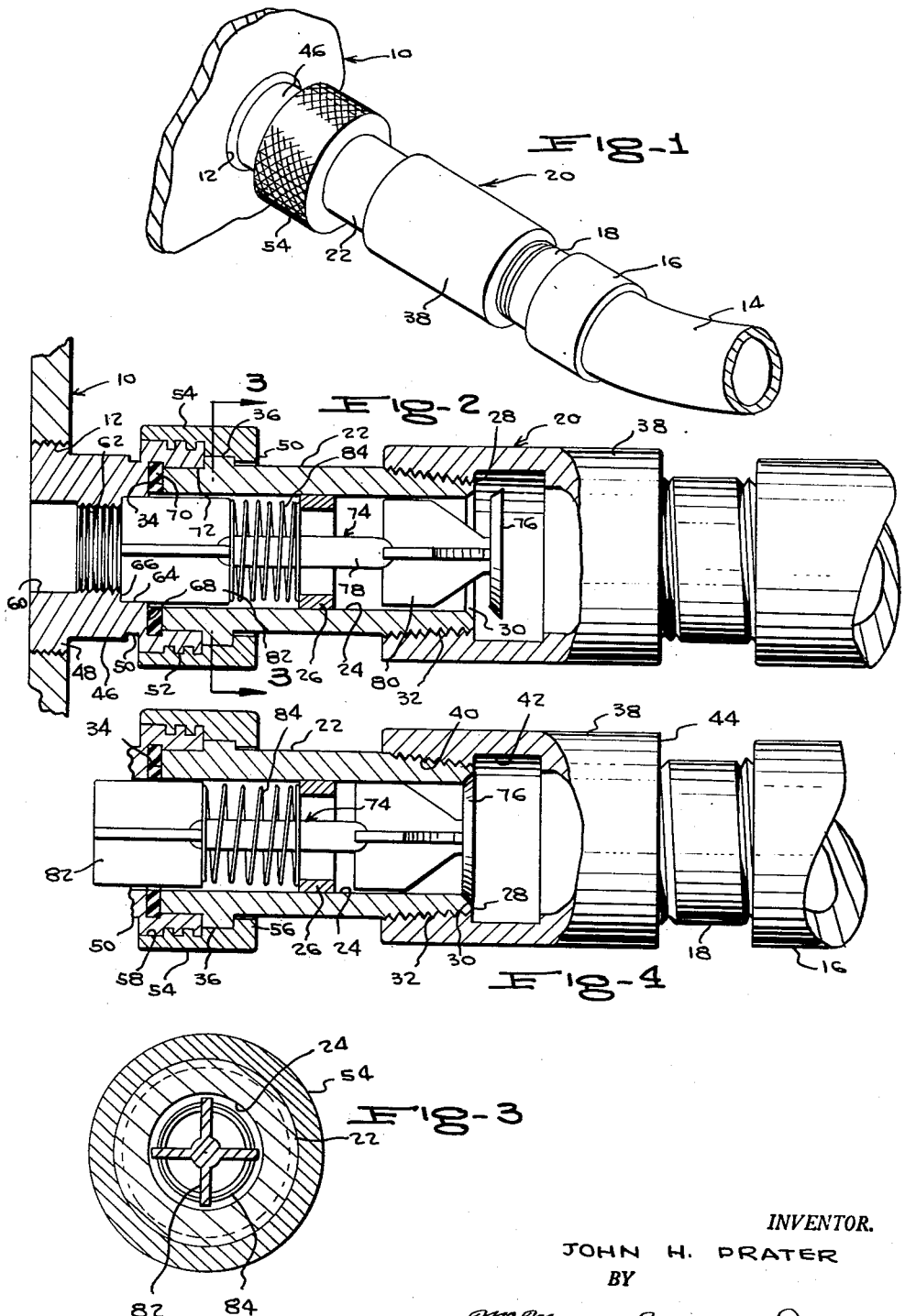
INVENTOR.
JOHN H. PRATER
BY
McMorrow, Berman & Davidson
ATTORNEYS United States Patent Office
2,804,317
Patented Aug. 27, 1957

2,804,317

SAFETY CUT-OFF VALVE

John H. Prater, Van, Tex.

Application January 25, 1957, Serial No. 636,420

2 Claims. (Cl. 284—19)

This invention relates generally to an improved safety cut-off valve especially adaptable for use between a servicing and storage tank wherein a pressurized fluid such as propane, butane or the like is dispensed, such gases being used for heating, cooking, etc.

Various storage tanks utilized for receiving the stored aforementioned gases, must be periodically serviced, and accordingly in the event the hose connection between the servicing and storage tanks accidentally become severed, there is an immediate danger of fire and an explosion, or the broken hose will whip around to the force of the escaping pressurized fluid, and an appreciable amount of the fluid may be lost, this being an unnecessary and undesirable expense.

A primary object of invention is to provide a safety cut-off valve interpositionable between a servicing and storage tank for gases of the character involved, said safety cut-off valve including means automatically actuated upon the severing of a portion of said valve wherein the accidental escape of the pressurized fluid in the storage tank will be prevented.

A still further object of invention in conformance with that set forth is to provide a novel safety cut-off valve of the character involved which is readily and economically manufactured, easily used, and highly satisfactory and practical for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a fragmentary perspective view showing a fragmentary wall portion of a servicing tank having connected thereto the novel safety cut-off valve of the invention which is shown connected to a fragmentary portion of a dispensing conduit;

Figure 2 is a side elevation of the structure shown in Figure 1, portions being broken away and shown in section for clarity;

Figure 3 is a section taken substantially on the plane of line 3—3 of Figure 2; and Figure 4 is an elevation similar to Figure 2, portions being broken away and shown in section for clarity, showing the position of the automatically actuated safety cut-off valve when a portion of the adaptor thereof is accidentally severed.

Referring to the drawing in detail, a fragmentary portion of the wall of a servicing tank is indicated generally at 10, said wall having extending therethrough an internally threaded transverse aperture 12. A portion of a flexible conduit is indicated at 14, said conduit being in communication with a suitable storage tank into which liquid butane, propane etc. will be dispensed, said conduit incorporating a suitably secured internally threaded metallic sleeve 16 connected to a suitable nipple element 18 which is threaded at opposite ends.

Indicated generally at 20 is the novel safety cut-off valve including an elongated tubular body member 22 incorporating an internal longitudinal bore portion 24 opening at opposite ends thereof. Fixedly secured about an intermediate inner peripheral portion of the bore 24 is an annular abutment ring 26. The body member 22 incorporates at its end 28 an annular beveled valve seat 30, and has circumposed about the end 28 external threads 32. The body member 22 incorporates adjacent the opposite end 34 thereof about an intermediate outer peripheral portion an annular abutment rib 36.

A tubular sleeve 38 incorporates an internally threaded end portion 40 threadedly engageable on the threaded portion 32 of the body member, said sleeve 38 incorporating an internal bore portion or chamber 42 in axial alignment with the bore portion 24 of the body member of the valve, the other end of the sleeve 44 incorporating an internally threaded bore portion received on the nipple element 18.

A tubular adaptor 46 incorporates an externally threaded annular flange 48 at one end received within the internally threaded aperture 12 of the wall of the servicing tank. The adaptor 46 incorporates an annular undercut groove portion 50 and includes an externally threaded sleeve portion 52. The undercut groove portion 50 constitutes that area which the adaptor will normally be fractured at due to a careless workman stepping on the same while servicing a storage tank, for example.

Circumposed about the body member 22 is a suitable clamp nut 54 which incorporates at one end a centrally apertured inwardly turned annular flange 56 engageable with the abutment rib 36 on the body member, the opposite end of the clamp nut 54 incorporating an internally threaded portion 58 engageable on the threaded portion 52 of the adaptor 46. The adaptor 46 incorporates a bore portion 60 communicating with the interior of a service tank, incorporating an internally threaded portion 62 adjacent that portion of the adaptor which is normally severed as seen, for example, in Figure 2. The bore portion 60 continues in an increased diameter portion 64 defining an abutment shoulder 66. The increased diametered bore portion 64 further continues in an annular increased diametered groove 68 receiving a suitable sealing washer 70 therein. The bore portion 60 terminates at the end opposite that which is received in the wall of the servicing tank a bore portion 72 receiving therein the end 34 of the body member 22. Indicated generally at 74 is a poppet valve including an annular sealing element 76 sealingly engageable on the annular valve seat of the end of the body member. The sealing element 76 has extending normal thereto and through the body member 22 of the valve a valve stem 78 incorporating a cruciform cross sectioned guide portion 80 disposed on one side of the annular abutment rib 26 in the body member of the valve, the terminal end of the valve stem 78 continuing in a terminal abutment portion 82 also having a cruciform cross section, said abutment element or portion 82 being received on the shoulder 66 of the adaptor 46. Circumposed about an intermediate portion of the valve stem 78 is a suitable compression spring 84 which is normally retained in the compressed condition shown in Figure 2, and which will urge the sealing element 76 into sealed engagement on the valve seat 30 when portion 50 of the adaptor 46, for example, is severed as clearly seen in Figure 4. The cruciform cross sectioned portions of the poppet valve stem 78 permit ready passage of the pressurized fluid through the safety cut-off valve and guide the same reciprocably within the bore 24 of the body member 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A safety cut-off valve assembly interpositionable between pressurized fluid storage and servicing tanks comprising a tubular body member including an annular shoulder portion about an intermediate inner peripheral portion thereof, external threads about one end of the body member, an annular valve seat at the one end of the body member, a tubular sleeve including one internally threaded end engageable in circumposed relation on the external threads of the body member, conduit means connectable to said sleeve for communication with a storage tank to be filled with a pressurized fluid, a poppet valve including a sealing element in the tubular sleeve sealingly engageable on the valve seat, said poppet valve including a valve stem extending normal to the sealing element and longitudinally through the body member, said valve stem having an intermediate portion extending through the annular shoulder portion on the body member and terminating in a transverse abutment portion, a compression spring circumposed on said valve stem between the abutment and shoulder portions urging the sealing element toward sealing engagement on the valve seat, a tubular adaptor including an threaded end for engagement in a threaded aperture in a servicing tank and having an annular undecut groove portion spaced from the threaded end, said adaptor terminating in an annular externally threaded end portion and including an annular recess opening into one end receiving the other end of the body member therein, an annular sealing gasket in the recess of the adaptor sealingly engageable with the other end of the body member, an annular abutment rib about an intermediate outer peripheral portion of said body member, a clamp nut including an annular apertured flange extending inwardly at one end abuttingly engageable on the abutment rib of the body member and including an internally threaded opposite end portion engageable on the threaded end of the adaptor, said adaptor including a reduced diametered recess on the inner periphery thereof defining an abutment shoulder engaging the transverse abutment portion on the valve stem accordingly overcoming the compression spring and permitting pressurized fluid to pass through the safety cut-off valve, severing of the adaptor in the location of said undercut groove portion resulting in the compression spring urging the sealing element into sealing engagement on the valve seat.

2. A safety cut-off valve assembly interpositionable between pressurized fluid storage and servicing tanks comprising a tubular body member including an annular shoulder portion about an intermediate inner peripheral portion thereof, external threads about one end of the body member, an annular valve seat at the one end of the body member, a tubular sleeve including one internally threaded end engageable in circumposed relation on the external threads of the body member, conduit means connectable to said sleeve for communication with a storage tank to be filled with a pressurized fluid, a poppet valve including a sealing element in the tubular sleeve sealingly engageable on the valve seat, said poppet valve including a valve stem extending normal to the sealing element and longitudinally through the body member, said valve stem having an intermediate portion extending through the annular shoulder portion on the body member and terminating in a transverse abutment portion, a compression spring circumposed on said valve stem between the abutment and shoulder portions urging the sealing element toward sealing engagement on the valve seat, a tubular adaptor including a threaded end for engagement in a threaded aperture in a servicing tank and having an annular undercut groove portion spaced from the threaded end, said adaptor terminating in an annular externally threaded end portion and including an annular recess opening into one end receiving the other end of the body member therein, an annular sealing gasket in the recess of the adaptor sealingly engageable with the other end of the body member, an annular abutment rib about an intermediate outer peripheral portion of said body member, a clamp nut including an annular apertured flange extending inwardly at one end abuttingly engageable on the abutment rib of the body member and including an internally threaded opposite end portion engageable on the threaded end of the adaptor, said adaptor including a reduced diametered recess on the inner periphery thereof defining an abutment shoulder engaging the transverse abutment portion on the valve stem accordingly overcoming the compression spring and permitting pressurized fluid to pass through the safety cut-off valve, severing of the adaptor in the location of said undercut groove portion resulting in the compression spring urging the sealing element into sealing engagement on the valve seat, an intermediate portion of the valve stem and abutment portion on tthe terminal end thereof comprising guide portions reciprocably received in the bore portion of the body member and including a cruiform cross-section permitting ready passage of pressurized fluid through the safety cut-off valve.

References Cited in the file of this patent
UNITED STATES PATENTS

| | | |
|---|---|---|
| 1,433,494 | Wyble | Oct. 24, 1922 |
| 2,135,889 | Flader | Nov. 8, 1938 |
| 2,757,684 | Ulrich | Aug. 7, 1956 |